US011245751B1

(12) United States Patent
Asati et al.

(10) Patent No.: US 11,245,751 B1
(45) Date of Patent: Feb. 8, 2022

(54) SERVICE OR NETWORK FUNCTION WORKLOAD PREEMPTION

(71) Applicant: Cisco Technology, Inc., San Jose, CA (US)

(72) Inventors: Rajiv Asati, Morrisville, NC (US); Arghya Mukherjee, Acton, MA (US); Carlos M. Pignataro, Cary, NC (US); Richard Montgomery Plane, Wake Forest, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/580,082

(22) Filed: Sep. 24, 2019

(51) Int. Cl.
 *H04L 29/08* (2006.01)
(52) U.S. Cl.
 CPC ...... *H04L 67/1021* (2013.01); *H04L 67/1008* (2013.01); *H04L 67/1012* (2013.01); *H04L 67/16* (2013.01); *H04L 67/322* (2013.01)
(58) Field of Classification Search
 CPC ............. H04L 67/1021; H04L 67/1008; H04L 67/1012; H04L 67/16; H04L 67/32
 USPC ........................................................ 709/226
 See application file for complete search history.

(56) References Cited

U.S. PATENT DOCUMENTS

| 8,572,284 | B2 * | 10/2013 | Moon | G06F 9/5044 |
| | | | | 709/238 |
| 2013/0051615 | A1 * | 2/2013 | Lim | G06K 9/00671 |
| | | | | 382/103 |
| 2015/0154047 | A1 * | 6/2015 | Chen | G06F 9/5083 |
| | | | | 718/103 |
| 2020/0045548 | A1 * | 2/2020 | Dowlatkhah | H04W 12/08 |
| 2020/0389414 | A1 * | 12/2020 | Bruno | H04L 43/16 |

OTHER PUBLICATIONS

ETSI, "Network Functions Virtualisation (NFV) Release 2; Protocols and Data Models; NFV descriptors based on TOSCA specification", ETSI GS NFV-SOL 001 V2.5.1, Dec. 2018, 205 pages.

(Continued)

*Primary Examiner* — Kevin T Bates
*Assistant Examiner* — Chen-Liang Huang
(74) *Attorney, Agent, or Firm* — Edell, Shapiro & Finnan, LLC (57) ABSTRACT

Techniques are described to provide service or network function workload preemption. In one example, a method includes identifying a network location at which a first function can be instantiated; determining whether compute resources are available at the network location to instantiate the first function; based on determining that compute resources are available, instantiating the first function; based on determining that compute resources are not available, determining whether preemption of a second function can be performed at the network location, wherein determining whether preemption of the second function can be performed is based, at least in part, on a comparison between a setup priority of the first function and a holdover priority of the second function; and, based on determining that preemption of the second function at the network location can be performed, performing preemption of the second function and instantiating the first function at the network location.

20 Claims, 4 Drawing Sheets

(56) References Cited

OTHER PUBLICATIONS

3GPP, "3rd Generation Partnership Project; Technical Specification Group Services and System Aspects; Universal Geographical Area Description (GAD) (Release 15)", 3GPP TS 23.032 V15.1 0, Sep. 2018, 32 pages.
OpenStack, "Live-migrate instances", Aug. 23, 2019, https://docs.openstack.org/nova/pike/admin/live-migration-usage.html, 9 pages.

\* cited by examiner

SERVICE OR NETWORK FUNCTION WORKLOAD PREEMPTION

TECHNICAL FIELD

The present disclosure relates to network equipment and services.

BACKGROUND

Mobile service providers are considering Mobile Network-as-a-Service (NaaS) options for mobile network infrastructures to offer numerous services through self-serving customer-facing portals for managing lifecycles through a single plane of glass. A mobile network infrastructure can involve physical, virtual, and/or hybrid functions, including network functions and/or service functions, spread across large geographies, which introduces operational challenges to service providers and/or network operators. Such challenges can cause difficulties in managing network/service functions across multiple domains.

DESCRIPTION OF EXAMPLE EMBODIMENTS

Overview

Techniques presented herein provide logic that considers setup priority and holdover priority of two functions in order to meaningfully determine function placement on an appropriate host (e.g., a Mobile Edge Computing (MEC) host) in an automated manner. In an example embodiment, a method is provided that includes identifying a network location at which a first function can be instantiated and determining whether compute resources are available at the network location to instantiate the first function. The method may include, based on determining that compute resources are available at the network location, instantiating the first function at the network location. The method may further include, based on determining that compute resources are not available at the network location, determining whether preemption of a second function can be performed at the network location in order to instantiate the first function at the network location, wherein determining whether preemption of the second function can be performed is based, at least in part, on a comparison between a setup priority of the first function and a holdover priority of the second function. The method may further include, based on determining that preemption of the second function at the network location can be performed, performing preemption of the second function and instantiating the first function at the network location.

Example Embodiments

As referred to herein, the terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

It is becoming more common for mobile service providers (SPs) to consider Mobile Network-as-s-Service (NaaS) for implementing or deploying mobile network infrastructures so as to offer numerous services through self-serving, customer-facing portal that allow for managing lifecycles through a single pane of glass. Operators are evaluating new business models around NaaS for Business-to-Any (B2X) consumer segments. SPs are looking to provide full automation for ordering and/or installation of workflows so as to significantly reduce time to market. In this context, some operators may 'pre-package' various flavors of NaaS in a web catalog where the end-users can place an order for service(s) and operationalize such service(s) without any manual intervention from an operator.

A mobile network infrastructure can involve physical, virtual, and/or hybrid functions, including network functions and/or service functions, spread across large geographies. In various implementations, virtual and/or hybrid functions may include virtual machine (VM) and/or containerized (v/c) based functions.

In some instances, functions can include network functions (NFs) such as, for example, Radio Units (RUs), Centralized Units (CUs), Distributed Units (DUs), and/or the like associated with virtualized Radio Access Networks (vRANs) for one or more Radio Access Technology (RAT) types; User Plane Functions (UPFs), Control Plane Functions (CPFs), Unified Data Management (UDM) entities; combinations thereof; and/or the like associated with Third Generation Partnership Project (3GPP) fourth (4th) generation (4G) core network (CN) functions, fifth (5th) generation (5G) CN functions, next generation (nG) CN functions; and/or the like for implementing mobile network functionality. In still some instances, functions can include service functions (SFs) such as, for example, Session Border Control (SBC) functions, Virtual Private Network (VPN) slices, firewall functions, deep packet inspection (DPI) functions, Content Data Network (CDN) caches, Internet of Things (IoT) functions; combinations thereof; and/or the like for implementing mobile network functionality.

In still some instances, any combination of NFs and/or SFs may be provided for implementing mobile network functionality. In still some instances, any combination of NFs and/or SFs may be provided via one or more slices for one or more slice types in which each slice type may provide any combination of functions (NFs and/or SFs) for implementing mobile network functionality.

In some instances, any combination of vRAN functions and/or CN functions may be implemented via one or more Mobile Edge Computing (MEC) hosts (e.g., compute nodes configured with compute resources) at one or more MEC locations (e.g., MEC data centers (DCs).

In some instances, implementing functions may involve vertical integration to create end-to-end (E2E) offerings (e.g., to provide connectivity for user equipment (UE) via RAN functions and CN functions to/from one or more data networks). However, there are a number of operational challenges that operators may face to provide such E2E solutions including, but not limited to: determining whether a new function (v/c SF/NF) and/or slice creation may be needed for a service-chain on an MEC host at a given MEC location that didn't previously exist; determining whether a new function (v/c SF/NF) and/or slice creation may be needed in order to move any existing slices around to free-up network resources (e.g., RAN, CDN, etc.); determining whether a new function (v/c SF/NF) and/or slicing/hard segmentation may not be achieved in a given radio or pre-aggregation site (e.g., MEC location); determining a security posture if a new slice fails; determining if a slice type A is to be connected to a slice type B and/or if they are in different domains (e.g., 5G and 4G); combinations thereof; and/or the like.

These challenges may make it difficult for operators to manage network resources and/or services while meeting Service Level Agreement (SLA) SLA commitments across multiple-domains. However, many of these challenges may be overcome through tight control over what functions (NF or SF) are to be instantiated/run/executed, at which location(s), and/or at what point(s) of time through one or more times and/or ranges of times (e.g., days, time of day (ToD), etc.).

Presented herein are techniques to provide service or network function workload preemption that may such a control in a manner that regulates function placement with a system not only for initialization-time scenarios during which functions/slices may be created, but also for run-time scenarios during operations of functions/slices within the system.

Figure 1:
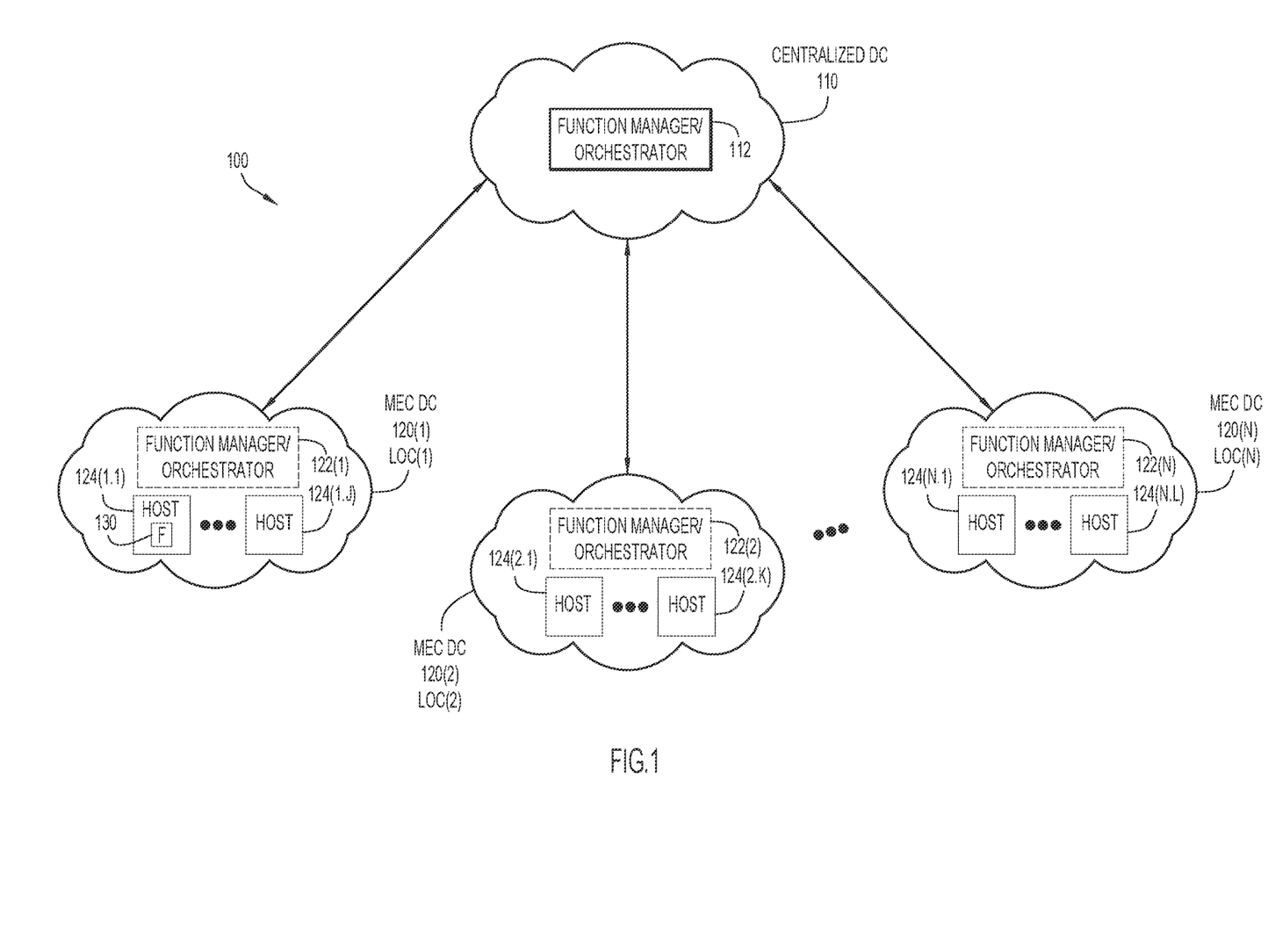
FIG. 1 is a block diagram of a system in which techniques for providing service or network function workload preemption may be implemented, according to an example embodiment.

FIG. 1 is a block diagram of a system 100 in which techniques for providing service or network function workload preemption may be implemented, according to an example embodiment. In at least one implementation, system 100 may include a centralized data center (DC) 110 and a number of MEC DCs 120, MEC DC 120(1)-MEC DC 120(N).

Each respective MEC DC 120(1)-120(N) may be associated with a respective geographic network location and/or area (LOC), illustrated in FIG. 1 as LOC(1)-LOC(N). In some embodiments, a geographic network location and/or area of an MEC DC may be identified using geographic-based information such as a geographic coordinate system (e.g., latitude and longitude), Global Positioning System (GPS) coordinates, Geographical Area Descriptions (GADs) (as may be defined in 3GPP Technical Specification (TS) 23.032), combinations thereof, and/or the like. In still some embodiments, a geographic network location and/or area of an MEC DC may be identified using 3GPP-based information such as Cell Global Identifiers (CGIs), Evolved Universal Mobile Telecommunication System (UMTS) Terrestrial RAN (E-UTRAN) Cell Global Identifiers (ECGIs), Service Area Identifiers (SAIs), Routing Area Identifiers (RAIs), combinations thereof, and/or the like. In still some embodiments, any combination of geographic-based and 3GPP-based information.

In some embodiments multiple MEC DCs may be configured in a same geographic area. Thus, geographic network locations and/or areas of MEC DCs 120 may be configured according to any level of granularity and are not limited to each respective MEC DC 120 being associated with one respective network location and/or area.

In at least one embodiment, centralized DC 110 may include any combination of a centralized function manager and/or orchestrator (manager/orchestrator) 112, which may perform one or more operations associated with function workload preemption described herein. In some embodiments, any combination of MEC DCs 120(1)-120(N) may include any combination of a respective MEC function manager/orchestrator 122(1)-122(N), which may perform one or more operations associated with function workload preemption described herein.

In still some embodiments, any combination of MEC function managers/orchestrators 122(1)-122(N) may be implemented in addition to and/or in lieu of centralized function manager/orchestrator 112 in order to perform operations described herein. For example, in some instances some operations, such as identifying one or more network locations (e.g., MEC locations) at which one or more function workloads may be preempted, may be performed by centralized function manager/orchestrator 112 while other operations, such as determining whether one or more functions may actually be preempted at a given location, may be performed by each corresponding MEC function manager/orchestrator 122 at each identified corresponding MEC location 120. Other variations of operational splits can be envisioned.

In at least one embodiment, MEC DC 120(1) may include a number of MEC hosts 124(1.1)-124(1.J), MEC DC 120(2) may include a number of MEC hosts 124(2.1)-124(2.K), and MEC DC 120(N) may include a number of MEC hosts 124(N.1)-124(N.L). It is to be understood that the number of MEC DCs 120 and the number of MEC hosts 124 per each MEC DC may be varied. As discussed herein, in some instances, no MEC hosts may be configured at a particular MEC location, which may trigger one or more operations to be performed which may cause one or more hosts to be configured at the particular location.

In at least one implementation, an MEC host (e.g., MEC host 124(1.1)) may be a compute node (also referred to herein more generally as a 'node') configured with compute resources that are capable of instantiating and operating one or more functions 130 (e.g., v/c functions) within system 100. In various embodiments, compute resources may include, but not be limited to, any combination of processors, memory, storage, buses, communication units, input/output (I/O) interfaces, etc. As referred to herein, the terms 'MEC host' and 'compute node' can be used interchangeably.

By way of example only, MEC host 124(1.1) may include a function 130 instantiated and currently running thereon. In some embodiments, v/c functions can include v/c NFs such as, for example, RUs, CUs, DUs, and/or the like associated with vRANs for one or more RAT types; UPFs, CPFs, UDM entities; combinations thereof; and/or the like associated with 4G CN functions, 5G CN functions, nG CN functions; and/or the like for implementing a mobile network infrastructure and/or functionality within system 100. In still some instances, functions can include v/c SFs such as, for example, SBC functions, VPN slices, firewall (FW) functions, DPI functions, CDN caches, IoT functions; combinations thereof; and/or the like for implementing a mobile network infrastructure and/or functionality within system 100. In still some embodiments, any combination of NFs and/or SFs may be provided for implementing a mobile network infrastructure and/or functionality within system 100. In still some instances, any combination of NFs and/or SFs may be provided via one or more slices for one or more slice types in which each slice type may provide any combination of functions (v/c NFs and/or v/c SFs) for implementing a mobile network infrastructure and/or functionality within system 100.

Centralized DC 110 and centralized function manager/orchestrator 112 may be in communication, via one or more communication networks (wired and/or wireless), with each MEC DC 120 and corresponding MEC hosts 124 and/or MEC function manager/orchestrators 122 (if implemented) configured at each MEC DC 120.

Using techniques described herein, system 100 provides for the ability to leverage decisions for determining whether one or more of the compute nodes (e.g., MEC hosts 124) in one or more designated MEC DC locations may be better suited to host one or more functions (v/c SF/NF) during instantiation and/or afterwards during run-time based on a priority comparison between functions.

Two priorities may be defined for every function that may be instantiated and operated within system 100 including a 'setup priority' and a 'holdover priority'. In general, the setup priority of a function indicates a priority associated with setting up (e.g., instantiating and operating) the function. In general, the holdover priority of a function indicates a priority associated with the function as it is currently running on an MEC host. The holdover priority of a function that is currently running on an MEC host can be used to determine whether the function may or may not be preempted in order to instantiate a new function on the MEC host.

During operation of system 100, for example, a comparison between the setup priority of a first function that is to be instantiated and the holdover priority of a second function that is currently running on a particular compute node (e.g., MEC host) at a particular MEC location (e.g., function 130 on MEC host 124(1.1) at MEC DC 120(1)) can be used to determine whether the second function can be preempted in order to instantiate the first function on the particular compute node.

The setup priority and the holdover priority or, more generally, 'priorities', of a function can be determined using a variety of techniques. For example, in some embodiments, the priorities of a function may be assigned to the function within a descriptor file/information associated with the function. In general, a descriptor file is a declarative piece of code (typically in YAML or YANG) that allows a Virtualized Network Function Manager and/or Orchestrator (VNFM/O) (e.g., function manager/orchestrator 112) to deploy and manage a Virtual Network Function (VNF) (or more generally v/c functions). In some embodiments, descriptor files may be based on European Telecommunications Standards Institute (ETSI) Group Specification (GS) NFV-SOL 001.

In still some embodiments, priorities of a function may be calculated based on weighted formulas that may incorporate values for categories of functions (e.g. all network functions pertaining to vRAN, service functions related to security, service functions related to voice and/or Internet Protocol (IP) Multimedia Subsystem (IMS), service functions related to emergency services, network functions pertaining to network infrastructure, management functions etc.) In still some embodiments, weighted formulas for calculating function priorities may incorporate values for function types, such as types of functions within a category (e.g., RU functions, CU functions, or DU functions within the vRAN category of functions; general vRAN type of functions within a category of network infrastructure that may deliver a common service; different service functions related to security such as firewall or DPI, etc.), router functions, etc.

In still some embodiments, weighted formulas for calculating function priorities may incorporate values for capabilities and/or operational/compute requirements of functions (e.g., as may be identified in the descriptor file/information of a function) such as, for example, an indication that Field Programmable Gate Array (FPGA) based acceleration may be needed for a function, that a function may be In-Situ Operations Administration and Management (iOAM) capable, compute resources for a function such as memory and processing needs for the function, bandwidth needs of a function, latency or ranges of latencies associated with a function, Service Level Agreement (SLA) information, combinations thereof, and/or the like.

Consider, in one example, a first function (Function A) and a second function (Function B), each of which may have a corresponding setup priority and a corresponding holdover priority as may be defined by the descriptor file/information associated with each corresponding function and may be expressed as follows:

Function A: {setup priority, holdover priority}={100, 100}

Function B: {setup priority, holdover priority}={120, 150}

The format for representing setup priority and holdover priority may also be expressed as {setup:holdover}={#:#}. Other variations for representing/expressing function priorities can be envisioned.

Consider, in another example, weighted formulas for calculating the setup priority and the holdover priority for functions belonging to a particular function category (Category) of a particular function type (Type) may be expressed as follows:

$$\text{setup priority} = (\text{Category}^*(m)) + (\text{Type}^*(n))$$

$$\text{holdover priority} = (\text{Category}^*(m)) + (\text{Type}^*(n)) +/- \text{variance}$$

For the weighted formulas, 'm' and 'n' may represent weight values that may be assigned by a network operator/SP, variance may also be a value that may be set by the network operator/SP, and different function categories and function types may also be values that may be assigned by the network operator/SP. Consider, for example, that different function category values can be assigned, such as Category: Network Infrastructure=30, Management=50, Security=25, IMS=20, etc. and that different function type values can be assigned such as Type: vRAN=10; routers=11 . . . ; firewall=15, DPI=10 . . . ; etc.

In still some embodiments, weighted formulas for calculating function priorities may incorporate values for slice types such that calculating a priority for a function may incorporate a value based on the type of slice to which the function belongs. Consider, for example, that calculating setup and holdover priority for a function based additionally on slice type (Slice) may be expressed as follows:

$$\text{setup priority} = (\text{Category}^*(m)) + (\text{Type}^*(n)) + (\text{Slice}^*(p))$$

$$\text{holdover priority} = (\text{Category}^*(m)) + (\text{Type}^*(n)) + (\text{Slice}^*(p)) +/- \text{variance}$$

For the weighted formulas, 'p' may represent a weight value that may be assigned by a network operator/SP.

In still some embodiments, weighted formulas for calculating function priorities may incorporate time-based values and/or information (e.g., days, ToD, ranges thereof, etc.) related to functions themselves and/or to other system/network resource such that time-weight values may be incorporated into calculations. For example, in some embodiments it may be determined that certain network locations may experience increased demand for vRAN resources on certain days/certain ToDs. Thus, formulas for calculations for determining function priorities may have different time-weight values applied at different network locations and/or times within system 100. Other variations involving different scenarios in which different time-based considerations may be utilized can be envisioned.

These examples of values/information that may be incorporated into weighted formulas for calculating function priorities are only a few of the many types of values/information that may be incorporated and/or considered for calculating function priorities and are not meant to limit the broad scope of the present disclosure. Virtually any other values/information that may be incorporated into weighted formulas for calculating function priorities and, thus, are clearly within the scope of the present disclosure.

Consider example operations that may be performed within system 100, in at least one embodiment, to determine whether a function may be preempted in order for another function to be instantiated within the system. For example, during or after instantiation of a new function (e.g., v/c SF/NF) per slice creation and/or modification, example operations may include a function manager/orchestrator, say centralized function manager/orchestrator 112, receiving a trigger to instantiate a function, say a 'Function A', in order to create and/or modify a particular slice (e.g., of a particular slice type).

In various embodiments, function workload preemption operations performed with system 100 can be reactive or proactive. Consider an example in which a request (e.g., a trigger) is received for network resources pertaining to a particular network location, say network resources associated with a particular slice type to be instantiated at a particular vRAN location. In this example, the function workload preemption operations can be considered reactive to a system request to instantiate a function per slice creation/modification. Consider another example in which a network function manager/orchestrator and/or some other network entity is analyzing function operations, network conditions, etc. at one or more network locations. In this example, or more machine learning (ML) algorithms may be operating to analyze information gathered, received, and/or otherwise obtained for the network locations, such as telemetry Key Performance Indicators (KPIs) that may be received from running NFs/SFs. Receipt of such information may operate as triggers to optimize NF/SF placement at one or more network locations, for example, to decide which MEC hosts may be better to preempt if a new function were to be instantiated. In this example, the function workload preemption operations can be considered proactive in order to optimize or otherwise adjust workloads, network conditions, resource usage, etc. at one or more network locations. Thus, function workload preemption operations may be reactive or proactive in accordance with embodiments described herein.

Returning to the present example, upon receiving the trigger to instantiate Function A by centralized function manager/orchestrator 112, the operations may include identifying one or more network locations at which Function A may be instantiated. Consider in this example that the trigger received by centralized function manager/orchestrator 112 includes an indication that identifies a geographical network location associated with LOC(1) of MEC DC 120(1) such that centralized function manager/orchestrator 112 identifies MEC DC 120(1) as the suggested network (e.g., MEC) location at which workload preemption is to be checked.

In some embodiments, identifying one or more potential locations at which to instantiate a function may include gathering or otherwise obtaining properties and/or other information associated with various network locations. In some embodiments, this may include gathering compute information that may indicate any combination and/or variation of the total amount of compute resources at potential network locations, the amount of compute resources that may be currently utilized at potential network locations (e.g., number of central processor units (CPUs) currently utilized, number of CPU cores currently utilized, amount of memory currently utilized, etc.), and/or the currently available compute resources at potential network locations. In at least one embodiment, such properties/information can be contained within an object, sometimes referred to as a 'manifest', that can be updated based on available inventory and/or modifications thereof. In various embodiments, any combination of function manager/orchestrators within system 100 and/or any other nodes within system 100 may manage and/or track such utilization. In still some embodiments, compute information may include information regarding compute resources that may be reserved (e.g., allocated but not currently utilized) at a particular network location for one or more types of functions/slices. Setup and holdover priorities may be determined for reserved resources (also referred to herein as 'resource reservations', 'reserved functions', 'reserved slices', and variations thereof) using any techniques as discussed herein. In still some embodiments, gathering location properties may include gathering network resource information such as bandwidth information, network connection information (e.g., fiber, T1, etc.), latency information, load information, power information and/or considerations, time-based information and/or considerations, environmental information and/or considerations, etc. associated with potential network locations.

Returning to the present example, upon identifying the network location (e.g., MEC DC 120(1)), centralized function manager/orchestrator 112 may check to determine whether compute resources for the particular function, Function A, per the particular slice (e.g., as defined by the descriptor file of function A) requested for the suggested MEC location are available on any of the MEC hosts 124(1.1)-124(1.L) at that MEC location.

In some embodiments, prior to checking for compute resources at a particular network location for instantiating a given function, the operations may first include confirming that a suggested location has at least one MEC host configured thereat. If there is at least one MEC host configured at a suggested network location, the function workload preemption operations may continue. However, if there is not at least one MEC host configured at a suggested location, the operations may further include, in at least one embodiment, triggering an error to first instantiate an MEC host setup at that location.

In at least one embodiment, triggering such an error may cause one or more operations to be performed, such as generating a notification that includes an indication that at least one MEC host is not configured at the network location and/or that an MEC host needs to be configured at the network location. In another embodiment, the operations may include identifying a possible set of one or more other network (MEC) locations that might be better suited to host a function and providing recommendation identifying one or more of the network locations. In some embodiments, the recommended location(s) may be included in the generated notification.

In some embodiments, the operations may include triggering automated system/machine intervention operations that may include powering-on one or more compute nodes (MEC hosts) at the location, configuring one or more compute nodes at the location, starting one or more VMs, combinations thereof, and/or the like. In still some embodiments, the operations may include triggering one or more human intervention operations to install/configure one or more compute nodes at the location. Combinations of automated system/machine intervention operations, identifying and recommending one or more other potential network locations at which to host a function, and/or human intervention operations can be envisioned.

Returning to the present example, consider that centralized function manager/orchestrator 112 determines whether there are compute resources available at MEC DC 120(1) by comparing compute resources available at MEC DC 120(1) (e.g., based on the properties gathered for the location) with the amount of compute resources needed to instantiate Function A at the network location. Based on determining that compute resources are available at MEC DC 120(1), centralized function manager/orchestrator 112 may select an MEC host 124 at MEC DC 120(1) and instantiate Function A the host. Selection of an MEC host to instantiate a function may be performed using any method as may be understood in the art, now known here and/or hereinafter developed.

Based on determining that compute resources are not available at MEC DC 120(1), centralized function manager/orchestrator 112 may perform operations to determine whether any of the running functions per slice at MEC DC 120(1) are qualified to be preempted (e.g., moved to another MEC host, terminated, etc.) in order to make room for the new Function A to be instantiated at MEC DC 120(1).

Logic for determining whether a currently running function can be preempted in order to instantiate a new function, generally referred to herein as 'preemption analysis', is based on a comparison between a setup priority determined for the new function (e.g., using techniques as described herein) and a holdover priority determined for a currently running function (e.g., using techniques as described herein). Consider for the present example that the comparison is performed between a setup priority determined for Function A and a holdover priority determined for another function, say 'Function B', that may be currently running on an MEC host. For this example, the logic for determining whether Function B is qualified to be preempted may include, for each MEC host at the location:

If Function A (Setup Priority)>Function B (Holdover Priority), then preempt Function B and Instantiate Function A;

If Function A (Setup Priority)<Function B (Holdover Priority), then do not preempt Function B and find another host for Function A, if available.

In some embodiments, preempting a currently running function (e.g., Function B, in the present example) may include moving the function to another MEC host at a particular location or to another location. In some embodiments, if sufficient resources on another MEC host are not available for re-instantiating a currently running function, then preempting the currently running function could mean terminating the currently running function altogether.

In some embodiments, however, if disaggregation of a currently running function is allowed (e.g., if disaggregation is allowed by a function such as disaggregating an evolved Node B (eNB) into a vDU/vCU), then preempting a currently running function could mean moving part of the currently running function to another host in the same location (whereas the remainder could run in another location). For example, consider that if a particular vFW is running on Host A, which is appropriately suited to run vCU function, then vFW may be moved to Host B in a same location or to another location, depending on vFW criteria (e.g., priority, etc.).

For embodiments, in which the outcome of preempting a currently running function is to move the currently running function to another host, then make-before-break operations may be followed, if supported by the function itself, as are typically understood in the art, now known here and/or hereinafter developed. Consider for the present example, that make-before-break operations would involve creating another instance of Function B on another MEC host, plumbing the new instance of Function B into the network (e.g., establishing communications/operations), then deleting the old instance of Function B on the previous MEC host; and then instantiating Function A on the MEC host at which the old instance of Function B was deleted.

Consider an example involving MEC host 124(1.1) which may have 6 free (available) CPU cores, whereas another MEC host 124(1.2) (not shown) may have 4 available CPU cores. Further consider that compute resource criteria for Function A indicates a number of CPUs=6 and memory=2 GB with a {setup:holdover} priority of {200:180} and that compute resource criteria for Function B indicates a number of CPUs=2 and memory=2 GB with a {setup:holdover} priority of {150:150} and is currently running on MEC host 124(1.1). Using the logic described herein, Function B may be preempted with make-before-break operations being performed by centralized function manager/orchestrator 112 to re-instantiate Function B at MEC host 124(1.2), plumb Function B into the network, delete Function B at MEC host 124(1.1), and then instantiate Function A at MEC host 124(1.1).

Figure 2:
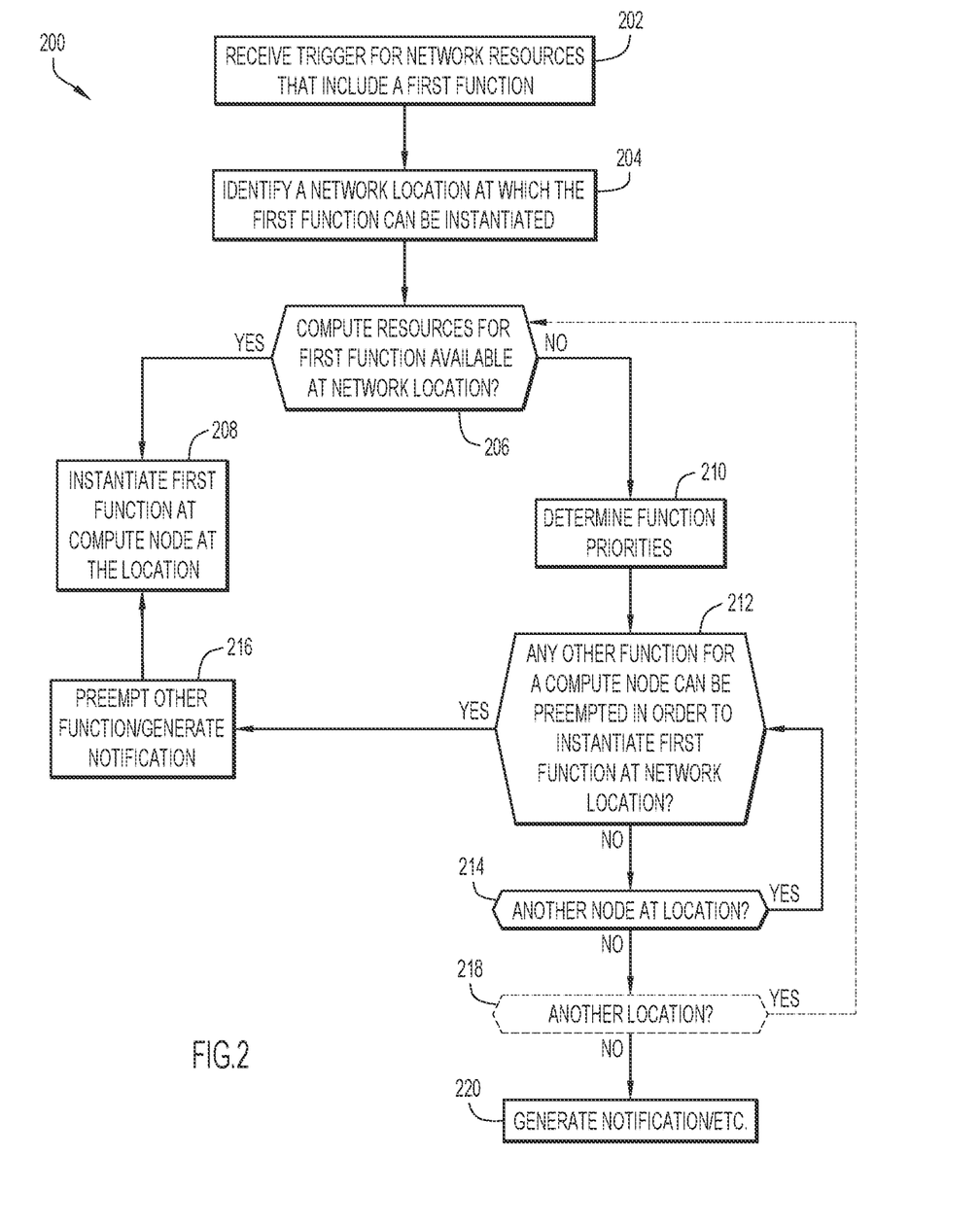
FIG. 2 is a flow chart depicting a method according to an example embodiment.

Referring to FIG. 2, FIG. 2 is a flow chart depicting a method 200 associated with function workload preemption operations that may be performed in a system, according to an example embodiment. In at various embodiments, function workload preemption operations associated with method 200 may be performed by any combination of function managers/orchestrators within a system (e.g., any combination of centralized function manager/orchestrator 112 and/or MEC function managers/orchestrators 122(1)-122(N). For operations described for the embodiment of FIG. 2, only one generalized function manager/orchestrator is discussed; however, this is not meant to limit the broad scope of the present disclosure.

At 202, the method may include the function manager/orchestrator receiving a trigger for network resources that include a first function (e.g., a v/c NF/SF). In at least one embodiment, the network resources may be associated with a slice type that includes the first function. In at least one embodiment, the operations at 202 may include the function manager/orchestrator gathering or otherwise obtaining a descriptor file for the first function based on the trigger in order to determine operational information associated with the first function and/or a slice with which the first function is associated. In various embodiments, any combination of a function manager/orchestrator and/or any other nodes in a system may store descriptor files for functions.

At 204, the method may include the function manager/orchestrator identifying a network location (e.g., an MEC DC) at which the first function can be instantiated. In various embodiments, the identifying at 204 may be based on any of: geographic location information included in the trigger; geographic location information associated with network locations within the system gathered by the function manager/orchestrator, network location information and/or properties gathered by the function manager/orchestrator, combinations thereof, and/or the like. In at least one embodiment, a network location may be identified as being at a geographic location closest to that for which a trigger was received.

In some embodiments, identifying a network location may include identifying one or more network locations at which the first function can be instantiated and further identifying an optimum, suggested, or first network location at which the function manager/orchestrator may first analyze to determine whether the first function can be instantiated (e.g., a geographic location closest to that for which a trigger was received, having or meeting certain location properties, criteria, etc. as may be needed for the first function, etc.).

At 206, the method may include the function manager/orchestrator determining whether compute resources are available at the network location in order to instantiate the first function at the location. In at least one embodiment, the determining at 206 may be based on a comparison between compute resources available at the location (e.g., based on information/properties gathered for the network location) and compute resources to be utilized by the first function to determine whether there are sufficient compute resources available at the network location for instantiating the first function. In some embodiments, the determining at 206 may be based on determining whether the first function is a function for which a reservation has been configured at the network location (e.g., if resource reservations are configured at the network location).

Based on determining at 206 that compute resources are available (e.g., not currently utilized or reserved) at the network location for instantiating the first function, the method may include the function manager/orchestrator instantiating the first function at a compute node (e.g., MEC host) at the network location, as shown at 208, and the method may end. The instantiating at 208 may include selecting a compute node using any technique as may be understood in the art, now known here and/or hereinafter developed.

However, based on determining at 206 that compute resources are not available at the network location for instantiating the first function, the method may include, at 210, the function manager/orchestrator determining function priorities for the first function and for each of one or more other second functions currently operating on compute nodes at the network location. The determining at 210 may include determining a setup priority for the first function and a holdover priority for each of the second functions currently running on compute nodes at the network location. In various embodiments, the determining at 210 may include any combination of determining assigned priorities (e.g., based on descriptor file assignments) and/or calculating weighted priorities based on one or more weighted formulas using any technique described herein. In some embodiments, the determining at 210 may include determining holdover priorities for one or more second functions for which reservations may be configured at the network location.

At 212 and 214, the method may include the function manager/orchestrator performing preemption analysis, in an iterative manner for each compute node (e.g., MEC host) at the network location (e.g., MEC DC), to determine whether any second function for a particular compute node can be preempted in order to instantiate the first function at the network location. For example, at 212, the function manager/orchestrator may analyze one or more second functions currently running on a first compute node at the network location by comparing the setup priority of the first function to the holdover priority of the second functions using logic as discussed herein in to determine whether any of the second functions currently running on the first compute node can be preempted. If it is determined at 212 that a particular second function can be preempted, the method may include the function manager/orchestrator preempting the particular second function at 216 (e.g., moving via make-before-break operations, terminating, or disaggregating) and instantiating the first function at the compute node at 208. In some embodiments, the method may include, at 216, generating a notification that a particular function at the network location has been preempted. In some embodiments, the notification may be used for tracking, managing, configuring, etc. functions at network locations.

However, if the function manager/orchestrator determines at 212 that no second functions currently operating on the first compute node, the method may include the function manager/orchestrator determining, at 214, whether there is another compute node configured at the network location at which the first function may be instantiated. Based on determining at 214 that there is another compute node at the network location, the method returns to 212 in order for the function manager/orchestrator to perform the preemption analysis again for the other compute node. However, based on determining at 214 that there is not another compute node at the network location, the method may include, at 220, the function manager/orchestrator generating a notification that the first function cannot be instantiated at the network location.

In some embodiments, upon determining at 214 that there is not another node at the network location to be analyzed, the method may include, at 218, the function manager/orchestrator determining whether there is another location identified (e.g., at 204, in some embodiments) at which the first function can be instantiated. Based on determining at 218 that there is another location at which the first function can be instantiated, the method may return to 206 for performing compute resource analysis for the other network location and, if applicable, performing the preemption analysis of compute nodes at 212, as discussed herein. However, based on determining at 218 that there is not another location at which the first function can be instantiated, the method may proceed to 220, as discussed above. Other operations that may be performed upon determining that there is not another node and/or location at which to instantiate a new function can be envisioned.

In some embodiments, the determining at 212 may include determining whether any second function currently running on a compute node may be preempted and/or whether a function for which a reservation may be configured at the network location may be preempted. For reserved functions, the preemption analysis may include comparing the setup priority determined for the first function and holdover priorities determined for one or more second functions for which reservations are configured. In some embodiments, based on determining at 212 that a reserved function may be preempted, the method may include, at 216, rather than performing preemption operations (since the reserved function is not currently running on the compute node) generating a notification that a particular function reservation at the network location has been preempted. In some embodiments, the notification may be used for tracking, managing, configuring, etc. reservations at network locations. However, based on determining at 212 that neither a function currently running on the compute node may be preempted nor any function reservation for the compute node may be preempted, the method may continue to 214 and continue therefrom, as discussed above.

Figure 3:
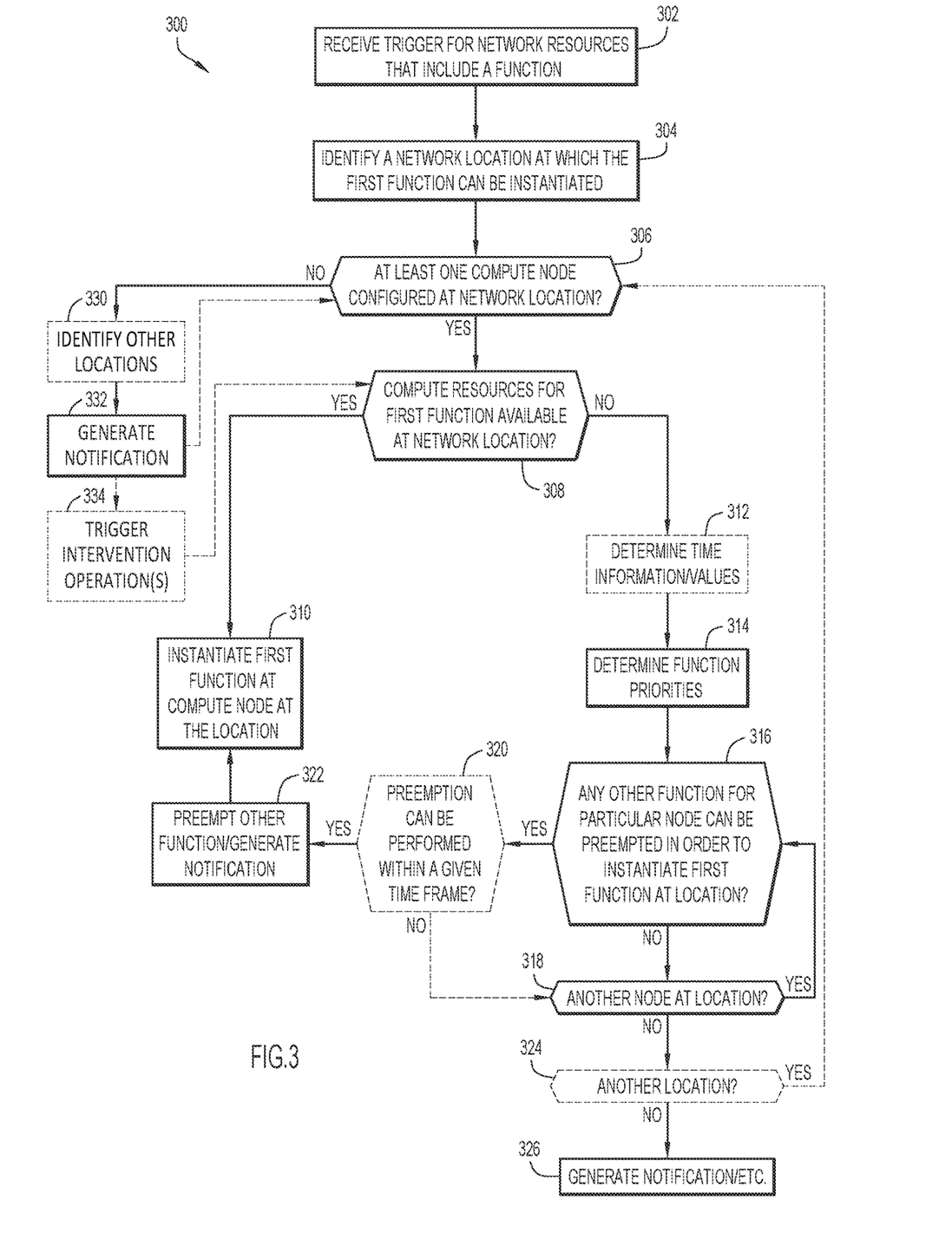
FIG. 3 is another flow chart depicting another method according to an example embodiment.

Referring to FIG. 3, FIG. 3 is another flow chart depicting another method 300 associated with function workload preemption operations that may be performed in a system, according to an example embodiment. In various embodiments, function workload preemption operations associated with method 300 may be performed by any combination of function managers/orchestrators within a system (e.g., any combination of centralized function manager/orchestrator 112 and/or MEC function managers/orchestrators 122(1)-122(N). For operations described for the embodiment of FIG. 3, only one generalized function manager/orchestrator is discussed; however, this is not meant to limit the broad scope of the present disclosure.

Several of the operations discussed for method 300 may be performed as discussed above for method 200 illustrated for the embodiment of FIG. 2. However, method 300 illustrates additional operations associated with determining whether at least one compute node (e.g., MEC host) is configured at a network location prior to performing the compute resource analysis of the location. In some embodiments, operations associated with time considerations may also be performed for method 300. It is to be understood that any of the operations discussed for method 300 illustrated for the embodiment of FIG. 3 may be combined in any manner with operations discussed for method 200 for the embodiment of FIG. 2.

At 302, the method may include the function manager/orchestrator receiving a trigger for network resources that include a first function (e.g., a v/c NF/SF). At 304, the method may include the function manager/orchestrator identifying a network location (e.g., an MEC DC) at which the first function can be instantiated. In at least one embodiment, operations at 302 may be performed as discussed above at 202 of FIG. 2 and operations at 304 may be performed as discussed above at 204 of FIG. 2.

At 306, the method may include the function manager/orchestrator determining whether there is at least one compute node (e.g., MEC host) configured at the network location (e.g., based on information/properties gathered for the network location). Based on determining at 306 that there is at least one compute node configured at the network location, the method may continue to 308 at which the function manager/orchestrator may perform operations as discussed above at 206 of FIG. 2 in at least one embodiment.

Based on determining at 306 that there is not at least one compute node configured at the network location, the method may include, at 332, the function manager/orchestrator generating a notification that includes an indication that at least one compute node is not configured at the network location and/or that a compute node needs to be configured at the network location.

In some embodiments, based on determining at 306 that there is not at least one compute node configured at the network location, the method may include, at 330, the function manager/orchestrator identifying and recommending one or more other network locations at which the first function can be instantiated. In such embodiments, the one or more other network locations may be included in the notification generated at 332. In some embodiments, if one or more other locations are identified at 330, the method may include returning to 306 and performing operations therefrom for one or more of the network locations.

In some embodiments, based on determining at 306 that there is not at least one compute node configured at the network location, the method may include, at 334, triggering one or more intervention operations (e.g., automated machine-based intervention operations and/or human intervention operations) in order to configure at least one compute node at the network location. In at least one embodiment, following configuration of the at least one compute node at the network location, the method may continue to 308 and continue therefrom for the network location.

As noted previously, operations at 308 may be performed for a network location as discussed above at 206 of FIG. 2 in at least one embodiment. Based on determining at 308 that compute resources for the first function are available at the network location, the method may include instantiating the first function at a compute node at the network location at 310. In at least one embodiment, operations at 310 may be performed as discussed above at 208 of FIG. 2.

Based on determining at 308 that compute resources for the first function are not available at the network location, the method may include, at 314, determining function priorities for the first function and for each of one or more other second functions currently operating on compute nodes at the network location. In at least one embodiment, operations at 314 may be performed discussed as discussed above at 210 of FIG. 2.

At 316 and 318, the method may include the function manager performing preemption analysis, in an iterative manner for each compute node (e.g., MEC host) at the network location (e.g., MEC DC), to determine whether any second function currently running on a particular compute node and/or reserved for the network location can be preempted in order to instantiate the first function at the network location. In at least one embodiment, the operations at 316 may be performed as discussed above at 212 of FIG. 2 and the operations at 318 may be performed as discussed above at 214 of FIG. 2.

Based on determining at 316 that a second function currently running on the compute node or reserved for the network location can be preempted, the method may include, at 322, preempting the second function and optionally generating a notification indicating the preemption (e.g., as discussed above at 216 of FIG. 2), and instantiating the first function at the compute node, as shown at 310.

Based on determining, at 316, that no second function can be preempted, the method may include the function manager/orchestrator determining, at 318, whether another compute node is configured the network location at which the first function may be instantiated. Based on a positive determination (YES) at 318, the method may return to 316 and continue therefrom. Based on a negative determination (NO) at 318, the method may include generating a notification at 326 (e.g., as discussed above at 220 of FIG. 2). In some embodiments, as shown at 324, the method may include the function manager/orchestrator determining whether there is another location identified (e.g., at 304, in some embodiments) at which the first function can be instantiated. In at least one embodiment, operations at 324 may be performed as discussed above at 218 of FIG. 2; however, based on determining at 324 that there is another location identified at which the first function can be instantiated, the operations may return to 306 and continue therefrom as discussed herein.

In some embodiments, time information/values such as, for example: a time frame or time frames (e.g., within a certain number of seconds, minutes, which may vary depending on network conditions, days, ToD, etc.) within which preemption operations are to be performed in order to maintain SLAs of a second function that is to be preempted; network location timing information/values that may be associated with the network location (e.g., loading, latency, etc. for the network location that may vary based on particular days, ToD, etc.); function timing information (e.g., function criteria such as latency, bandwidth, etc.); combinations thereof; and/or the like may be incorporated into function workload preemption operations. In such embodiments, the method may include, at 312, the function manager/orchestrator determining time information/values for any combination of the network location, the first function, and/or each of one or more other second functions currently operating on and/or reserved for compute node(s) at the network location.

For embodiments in which time information/values may be incorporated into workload preemption operations, the method may include, at 314, the function manager/orchestrator determining function priorities in a manner that may utilize such time information/values in order to calculate the a setup priority for the first function and a holdover priority for each of the second functions currently running on compute nodes at the network location and/or reserved for the network location. For embodiments in which time information/values may be incorporated into workload preemption operations, the method may include the function manager/orchestrator performing operations at 316, 318, 322, 326, and optionally 324 as discussed above.

However, in some embodiments if time information associated with a particular second function includes a time frame or time frames within which preemption operations are to be performed in order to maintain SLAs of the second function, the method may additionally include, based on the function manager/orchestrator determining, at 316, that a second function that is currently running on a particular compute node can be preempted, performing an additional check at 320 to determine whether one or more preemption operations (e.g., moving or disaggregating) can be performed within the time frame or frames to maintain SLAs of the second function. Based on a determination at 320 that the SLAs of the second function can be maintained, the method may continue to 322 to preempt the second function. However, based on a determination at 320 that the SLAs of the second function cannot be maintained, the method may continue to 318 and continue therefrom, as discussed above.

In summary, techniques presented herein provide logic that considers setup priority and holdover priority of two functions in order to meaningfully determine function placement on an appropriate host in an automated manner.

Figure 4:
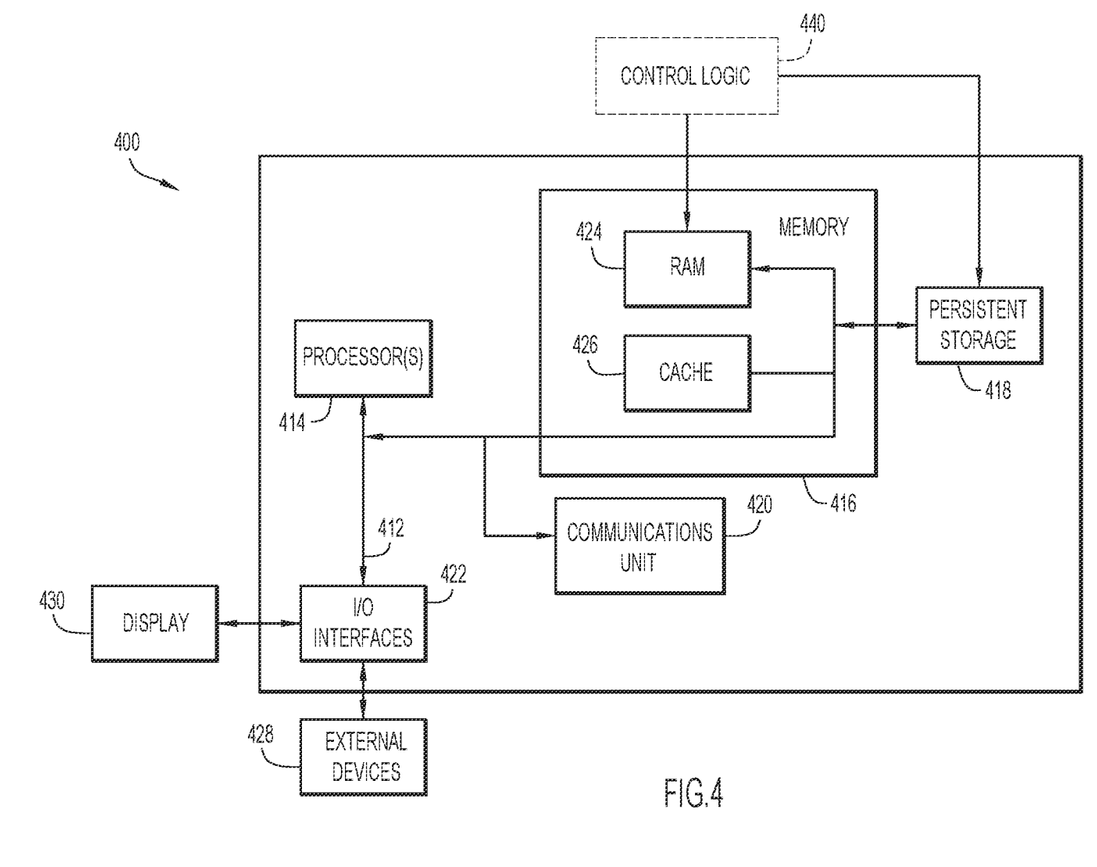
FIG. 4 is a hardware block diagram of a computing device that may perform functions for providing service or network function workload preemption, in connection with the techniques depicted in FIGS. 1-3.

Referring to FIG. 4, FIG. 4 illustrates a hardware block diagram of a computing device 400 that may perform the functions of a function manager/orchestrator (e.g., function manager/orchestrator 112 and/or any function manager/orchestrator 122), referred to herein in connection with FIGS. 1-3. It should be appreciated that FIG. 4 provides only an illustration of one embodiment and does not imply any limitations with regard to the environments in which different embodiments may be implemented. Many modifications to the depicted environment may be made.

As depicted, the device 400 includes a bus 412, which provides communications between computer processor(s) 414, memory 416, persistent storage 418, communications unit 420, and input/output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media, which can be inclusive on non-transitory computer readable storage media. In the depicted embodiment, memory 416, which may be inclusive of one or more memory element(s), may include random access memory (RAM) 424 and cache memory 426. In general, memory 416 can include any suitable volatile or non-volatile computer readable storage media. Instructions for control logic 440 may be stored in memory 416 and/or persistent storage 418 for execution by processor(s) 414. When the processor(s) 414 execute control logic 440, the processor(s) 414 are caused to perform the operations described above in connection with FIGS. 1-3.

One or more programs and/or other logic may be stored in persistent storage 418 for execution by one or more of the respective computer processors 414 via one or more memory element(s) of memory 416. The persistent storage 418 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical (e.g., wired) and wireless communications links.

I/O interface(s) 422, which may be inclusive of one or more network interface cards (NICs), allows for input and output of data with other devices that may be connected to computing device 400. For example, I/O interface 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

In one form, a computer-implemented method is provided and may include identifying a network location at which a first function can be instantiated; determining whether compute resources are available at the network location to instantiate the first function; based on determining that compute resources are available at the network location, instantiating the first function at the network location; based on determining that compute resources are not available at the network location, determining whether preemption of a second function can be performed at the network location in order to instantiate the first function at the network location, wherein determining whether preemption of the second function can be performed is based, at least in part, on a comparison between a setup priority of the first function and a holdover priority of the second function; and based on determining that preemption of the second function at the network location can be performed, performing preemption of the second function and instantiating the first function at the network location.

In some implementations, the method may further include prior to identifying the network location, receiving a trigger for network resources associated with a slice type that comprises the first function. In some implementations, the first function is at least one of a service function and a network function.

In some implementations, determining whether preemption of the second function can be performed at the network location may further include determining the setup priority of the first function; determining the holdover priority of the second function; and comparing the setup priority of the first function to the holdover priority of the second function, wherein the second function can be preempted when the setup priority of the first function is greater than the holdover priority of the second function. In some implementations, performing preemption of the second function and instantiating the first function at the network location may further include: performing preemption of the second function at a first compute node at the network location; and instantiating the first function at the first compute node at the network location.

In various implementations, performing preemption of the second function may further include one of: terminating the second function at the first compute node; instantiating the second function at a second compute node at the network location or at a second compute node at another network location and terminating the second function at the first compute node at the network location; and disaggregating the second function into one or more third functions, instating the one or more third functions at a second compute node at the network location or at a second compute node at another network location and terminating the second function at the first compute node at the network location.

In some implementations, identifying a network location at which a first function can be instantiated includes identifying one or more network locations at which the first function can be instantiated. In some implementations, determining whether compute resources are available at the network location to instantiate the first function may include identifying compute resources that are reserved at the network location for one or other functions.

In some implementations, the method may further include prior to determining whether compute resources are available at the network location, determining whether at least one compute node comprising compute resources is available at the network location; and based on determining that at least one compute nodes is not available at the network location, generating a notification to configure at least one compute node at the network location. In such implementations, the method may further include based on determining that at least one compute nodes is not available at the network location, identifying one or more other network locations at which the first function can be instantiated, wherein the notification comprises indications of the one or more other network locations.

In various implementations, the setup priority of the first function is based on one or more of: a function category with which the first function is associated; a function type within a function category with which the first function is associated; a slice type with which the first function is associated; and a time-based value or information associated with the first function. In various implementations, the setup priority of the second function is based on one or more of: a function category with which the second function is associated; a function type within a function category with which the second function is associated; a slice type with which the second function is associated; and a time-based value associated with the second function.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), wireless LAN (WLAN), Wide Area Network (WAN), Ethernet network, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number/combinations of any type of network (e.g., LAN, WAN, WLAN, Ethernet network, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Communications in a network environment can be referred to herein as 'messages', 'messaging', 'signaling', 'data', 'content', 'objects', 'requests', 'queries', 'responses', 'replies', 'notifications', etc. which may be inclusive of packets. Additionally, messages, requests, responses, replies, queries, notifications, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow charts and block diagrams in the figures illustrate the architecture, functionality, and operation of possible implementations of systems, methods, and computer program products according to various embodiments. In this regard, each block in the flow charts or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    identifying a network location at which a first function can be instantiated, wherein the first function includes a first setup priority and a first holdover priority, and wherein the first setup priority is based, at least in part, on a weighted function category for the first function and a weighted function type of the first function;
    determining whether compute resources are available at the network location to instantiate the first function;
    based on determining that compute resources are available at the network location, instantiating the first function at the network location;
    based on determining that compute resources are not available at the network location, determining whether preemption of a second function can be performed at the network location in order to instantiate the first function at the network location, wherein the second function includes a second setup priority and a second holdover priority and determining whether preemption of the second function can be performed is based, at least in part, on a comparison between the first setup priority of the first function and the second holdover priority of the second function, and wherein the second holdover priority is based, at least in part, on a variance value multiplied by a weighted function category for the second function and a weighted function type for the second function; and
    based on determining that preemption of the second function at the network location can be performed, performing preemption of the second function and instantiating the first function at the network location.

2. The method of claim 1, further comprising:
    prior to identifying the network location, receiving a trigger for network resources associated with a slice type that comprises the first function.

3. The method of claim 1, wherein the first function is at least one of a service function and a network function.

4. The method of claim 1, wherein determining whether preemption of the second function can be performed at the network location further comprises:
    determining the first setup priority of the first function;
    determining the second holdover priority of the second function; and
    comparing the first setup priority of the first function to the second holdover priority of the second function, wherein the second function can be preempted when the first setup priority of the first function is greater than the second holdover priority of the second function.

5. The method of claim 1, wherein performing preemption of the second function and instantiating the first function at the network location further comprises:
    performing preemption of the second function at a first compute node at the network location; and
    instantiating the first function at the first compute node at the network location.

6. The method of claim 5, wherein performing preemption of the second function further comprises one of:
    terminating the second function at the first compute node;
    instantiating the second function at a second compute node at the network location or at a second compute node at another network location and terminating the second function at the first compute node at the network location; and disaggregating the second function into one or more third functions, instating the one or more third functions at a second compute node at the network location or at a second compute node at another network location and terminating the second function at the first compute node at the network location.

7. The method of claim 1, wherein identifying a network location at which a first function can be instantiated includes identifying one or more network locations at which the first function can be instantiated.

8. The method of claim 1, further comprising:
   prior to determining whether compute resources are available at the network location, determining whether at least one compute node comprising compute resources is available at the network location; and
   based on determining that at least one compute nodes is not available at the network location, generating a notification to configure at least one compute node at the network location.

9. The method of claim 8, further comprising:
   based on determining that at least one compute nodes is not available at the network location, identifying one or more other network locations at which the first function can be instantiated, wherein the notification comprises indications of the one or more other network locations.

10. The method of claim 1, wherein determining whether compute resources are available at the network location to instantiate the first function comprises identifying compute resources that are reserved at the network location for one or more other functions that are not currently running at the network location.

11. One or more non-transitory computer readable storage media encoded with instructions that, when executed by a processor, cause the processor to perform operations, comprising:
   identifying a network location at which a first function can be instantiated, wherein the first function includes a first setup priority and a first holdover priority, and wherein the first setup priority is based, at least in part, on a weighted function category for the first function and a weighted function type of the first function;
   determining whether compute resources are available at the network location to instantiate the first function;
   based on determining that compute resources are available at the network location, instantiating the first function at the network location;
   based on determining that compute resources are not available at the network location, determining whether preemption of a second function can be performed at the network location in order to instantiate the first function at the network location, wherein the second function includes a second setup priority and a second holdover priority and determining whether preemption of the second function can be performed is based, at least in part, on a comparison between the first setup priority of the first function and the second holdover priority of the second function, and wherein the second holdover priority is based, at least in part, on a variance value multiplied by a weighted function category for the second function and a weighted function type for the second function; and
   based on determining that preemption of the second function at the network location can be performed, performing preemption of the second function and instantiating the first function at the network location.

12. The media of claim 11, further comprising instructions that, when executed by the processor, cause the processor to perform further operations, comprising:
   prior to identifying the network location, receiving a trigger for network resources associated with a slice type that comprises the first function.

13. The media of claim 11, wherein determining whether preemption of the second function can be performed at the network location further comprises:
   determining the first setup priority of the first function;
   determining the second holdover priority of the second function; and
   comparing the first setup priority of the first function to the second holdover priority of the second function, wherein the second function can be preempted when the first setup priority of the first function is greater than the second holdover priority of the second function.

14. The media of claim 11, wherein identifying a network location at which a first function can be instantiated includes identifying one or more network locations at which the first function can be instantiated.

15. An apparatus comprising:
   at least one memory element for storing data; and
   at least one processor for executing instructions associated with the data, wherein executing the instructions causes the apparatus to perform operations, comprising:
      identifying a network location at which a first function can be instantiated, wherein the first function includes a first setup priority and a first holdover priority, and wherein the first setup priority is based, at least in part, on a weighted function category for the first function and a weighted function type of the first function;
      determining whether compute resources are available at the network location to instantiate the first function;
      based on determining that compute resources are available at the network location, instantiating the first function at the network location;
      based on determining that compute resources are not available at the network location, determining whether preemption of a second function can be performed at the network location in order to instantiate the first function at the network location, wherein the second function includes a second setup priority and a second holdover priority and determining whether preemption of the second function can be performed is based, at least in part, on a comparison between the first setup priority of the first function and the second holdover priority of the second function, and wherein the second holdover priority is based, at least in part, on a variance value multiplied by a weighted function category for the second function and a weighted function type for the second function; and
      based on determining that preemption of the second function at the network location can be performed, performing preemption of the second function and instantiating the first function at the network location.

16. The apparatus of claim 15, wherein the first function is at least one of a service function and a network function.

17. The apparatus of claim 15, wherein determining whether preemption of the second function can be performed at the network location further comprises:
- determining the first setup priority of the first function;
- determining the second holdover priority of the second function; and
- comparing the first setup priority of the first function to the second holdover priority of the second function, wherein the second function can be preempted when the first setup priority of the first function is greater than the second holdover priority of the second function.

18. The method of claim 1, wherein the first setup priority is a priority for instantiating the first function.

19. The method of claim 1, wherein the first setup priority and the first holdover priority are different priority values for the first function and wherein the second setup priority and the second holdover priority are different priority values for the second function.

20. The method of claim 1, wherein the second holdover priority is a priority for the second function as it is currently running.

\* \* \* \* \*